(12) United States Patent
Callaghan

(10) Patent No.: US 8,104,736 B2
(45) Date of Patent: Jan. 31, 2012

(54) GAS TURBINE ENGINE AUXILIARY COMPONENT MOUNT

(75) Inventor: Craig M. Callaghan, East Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1383 days.

(21) Appl. No.: 11/291,348

(22) Filed: Dec. 1, 2005

(65) Prior Publication Data

US 2007/0125087 A1   Jun. 7, 2007

(51) Int. Cl.
*F16M 13/00* (2006.01)

(52) U.S. Cl. ........ 248/557; 248/554; 248/555; 248/556; 248/300; 248/909; 29/281.1

(58) Field of Classification Search .......... 248/554–557, 248/300, 220.1, 560, 562, 566, 637, 638, 248/669, 674, 909; 188/371, 372, 376, 377; 267/152, 153; 29/281.1

See application file for complete search history.

(56) References Cited

U.S. PATENT DOCUMENTS

| 2,060,604 | A | * | 11/1936 | Bartlett | 248/544 |
| 2,091,679 | A | * | 8/1937 | Grant | 267/141.1 |
| 2,317,190 | A | * | 4/1943 | Henshaw | 248/556 |
| 2,351,427 | A | * | 6/1944 | Henshaw | 248/556 |
| 2,467,759 | A | * | 4/1949 | Lord | 248/556 |
| 2,650,050 | A | * | 8/1953 | Chandler | 248/554 |
| 2,761,638 | A | * | 9/1956 | Getline | 248/556 |
| 2,949,268 | A | * | 8/1960 | Haberkorn et al. | 248/555 |
| 3,056,569 | A | * | 10/1962 | Bligard | 248/555 |
| 3,869,017 | A | * | 3/1975 | Feustel et al. | 180/232 |
| 3,930,665 | A | * | 1/1976 | Ikawa | 280/751 |
| 4,412,774 | A | * | 11/1983 | Legrand et al. | 414/589 |
| 4,725,019 | A | * | 2/1988 | White | 244/54 |
| 4,919,403 | A | * | 4/1990 | Bartholomew | 267/165 |
| 5,064,144 | A | * | 11/1991 | Chee | 244/54 |
| 5,178,230 | A | * | 1/1993 | Goor | 180/232 |
| 5,273,249 | A | * | 12/1993 | Peterson et al. | 248/550 |
| 5,351,930 | A | * | 10/1994 | Gwinn et al. | 248/557 |
| 5,435,124 | A | | 7/1995 | Sadil et al. | |
| 5,439,189 | A | * | 8/1995 | Wiley et al. | 244/54 |
| 5,687,948 | A | * | 11/1997 | Whiteford et al. | 248/635 |

(Continued)

FOREIGN PATENT DOCUMENTS

EP   0505325 A1   9/1992

(Continued)

OTHER PUBLICATIONS

Search Report PCT/US2006/037381.

*Primary Examiner* — Terrell McKinnon
*Assistant Examiner* — Michael McDuffie
(74) *Attorney, Agent, or Firm* — Carlson, Gaskey & Olds, PC

(57) ABSTRACT

A mount system for an auxiliary component includes two side brackets and a top bracket for rigidly attaching an auxiliary component to an engine casing. Each side bracket defines mount segments, a deformable member and two retainer members between the mount segment. The deformable member plastically deforms during a fan-blade out event, thereby absorbing a majority of the high shock load experienced on the auxiliary component. The retainer members maintain the attachment between the auxiliary component and the engine casing subsequent to the fan-blade out event.

14 Claims, 7 Drawing Sheets

U.S. PATENT DOCUMENTS

| | | | |
|---|---|---|---|
| 5,732,801 A * | 3/1998 | Gertz | 188/377 |
| 5,799,924 A * | 9/1998 | Slocum et al. | 248/636 |
| 5,813,649 A * | 9/1998 | Peterson et al. | 248/618 |
| 6,065,742 A * | 5/2000 | Whiteford | 267/140.5 |
| 6,231,095 B1 * | 5/2001 | Chou et al. | 293/133 |
| 6,286,895 B1 * | 9/2001 | Urushiyama et al. | 296/187.03 |
| 6,296,203 B1 * | 10/2001 | Manteiga et al. | 244/54 |
| 6,357,220 B1 | 3/2002 | Snyder et al. | |
| 6,361,092 B1 * | 3/2002 | Eagle et al. | 293/102 |
| 6,398,259 B1 * | 6/2002 | Palmer et al. | 280/777 |
| 6,557,816 B2 * | 5/2003 | Yoshida | 248/674 |
| 6,591,949 B2 * | 7/2003 | Kitano et al. | 188/371 |
| 6,669,393 B2 * | 12/2003 | Schilling | 403/2 |
| 6,715,746 B2 | 4/2004 | Bachmeyer et al. | |
| 6,736,448 B2 * | 5/2004 | Hanakawa et al. | 296/187.09 |
| 6,932,201 B2 * | 8/2005 | Akiyama et al. | 188/377 |
| 6,964,451 B1 * | 11/2005 | Bergey | 297/216.1 |
| 7,389,860 B2 * | 6/2008 | Abu-Odeh et al. | 188/377 |
| 2002/0079630 A1 | 6/2002 | Bachmeyer et al. | |
| 2005/0236241 A1 * | 10/2005 | Dusserre-Telmon et al. | 188/371 |

FOREIGN PATENT DOCUMENTS

| | | |
|---|---|---|
| EP | 1010878 A2 | 6/2000 |
| EP | 1010879 A2 | 6/2000 |
| EP | 1013911 A2 | 6/2000 |
| GB | 2100683 A | 1/1983 |
| JP | 2005-329874 | 12/2005 |

* cited by examiner

GAS TURBINE ENGINE AUXILIARY COMPONENT MOUNT

BACKGROUND OF THE INVENTION

The present invention relates to a mounting system, and more particularly to an energy absorbing mount system for a gas turbine engine auxiliary component.

Gas turbine aircraft engines utilize a turbine fan to draw ambient air into the engine for compression and combustion by the engine. The turbine fan is shrouded by an engine casing. Typically, a variety of auxiliary components such as engine oil tanks, gearboxes, valves, control systems for regulating the engine's operations, and other components are mounted to the engine casing. Various mounting systems mount the auxiliary components to the engine casing.

Conventional mounting systems typically include a plurality of rigid bracket members that are attached between the auxiliary component and the engine casing by a series of shear pins. Such conventional mounting systems may also include isolators that damp the transmission of engine vibratory loads to the auxiliary components during normal loading and operating conditions.

Conventional mounting systems may become subjected to a high degree of shock loading not experienced during normal engine operating conditions. For example, a high shock load may result from a fan-blade out event. A fan-blade out event occurs when a fan-blade breaks off of an engine rotor body as a result of impact with a foreign object. A fan-blade out event results in an imbalance in the engine rotor body which may also cause outward deflection and a rotor body shaft imbalance. Although effective, conventional mount systems are manufactured with relatively heavy and bulky hardware to provide the high strength and durability to resist normal engine operating conditions as well as the high shock loads to prevent separation of the auxiliary components from the engine casing.

Accordingly, it is desirable to provide a mount system for a gas turbine engine auxiliary component that is light in weight, relatively inexpensive to produce, and yet effectively and reliably absorbs a shock load from a fan-blade out event.

SUMMARY OF THE INVENTION

A mount system according to the present invention provides a rigid mount for an engine auxiliary component in addition to providing energy absorption during a high shock loading event.

The three-point mount system includes two side brackets and a top bracket to mount an auxiliary component to an engine casing. The side brackets are positioned near a center of gravity of the auxiliary component. The top bracket is offset axially toward an end of the auxiliary component.

Each side bracket includes a first mount segment, a second mount segment, a deformable member and two retainer members. The deformable member is laminated between the retainer members. A series of openings are defined through the deformable member. The retainer members are at least partially non-planar and face the deformable member.

During a fan-blade out event, the deformable member fragments to absorb a significant portion of the high shock load experienced by the auxiliary component. Any subsequent load is absorbed by the non-planar sections of the retainer members which also then retain the auxiliary component to the engine casing after the event.

The energy absorbing mount system of the present invention provides a mount system for a gas turbine engine auxiliary component that is light in weight, relatively inexpensive to produce, and yet effectively and reliably absorbs a shock load from a fan-blade out event.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
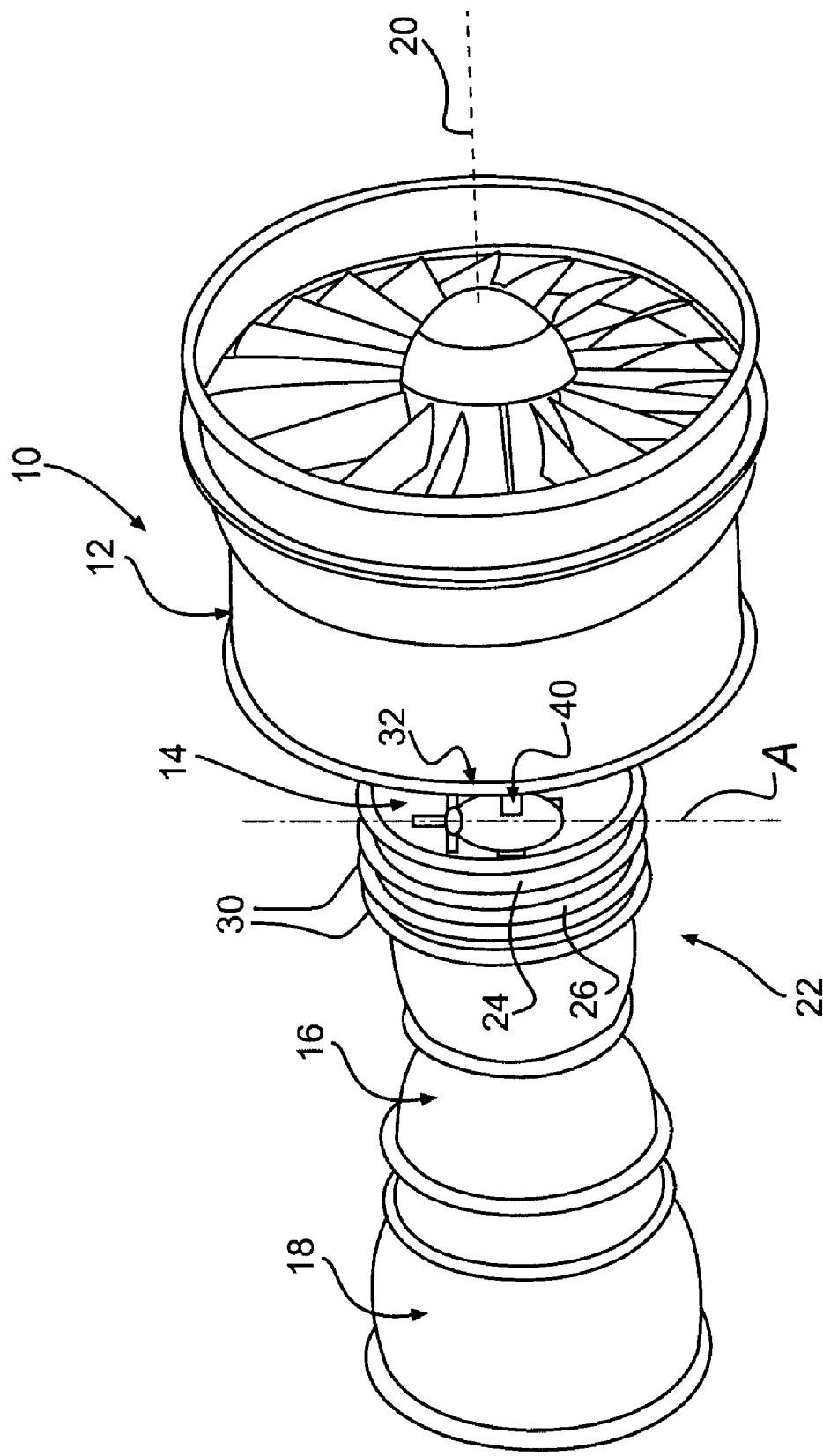
FIG. 1 is a perspective view of a gas turbine engine assembly having an auxiliary component for mounting on the engine's external casing.

Referring to FIG. 1, a gas turbine engine 10 generally includes a fan section 12, a compression section 14, a combustion section 16 and a turbine section 18. The compression and turbine sections each contain one or more stages of a compressor and a turbine (not shown) which rotate about an engine longitudinal axis 20. The components of the gas turbine engine 10 are circumscribed by an essentially cylindrical engine casing 22. The engine casing 22 serves as a main structural support for the gas turbine engine 10. The engine casing 22 is usually constructed of individual case sections, such as case sections 24 and 26, which are joined together at bolted flanges such as engine case flange 30.

An auxiliary component 32 is mounted to the engine casing 22 by a mount system 40 along an auxiliary component axis A which is generally transverse to the engine longitudinal axis 20. The auxiliary component 32 may include any component known in the art that requires mounting to the engine casing 22, including but not limited to an oil tank, a gearbox, valves and electronic control systems for regulating the operations of the gas turbine engine 10 and may be mounted in any orientation.

Figure 2:
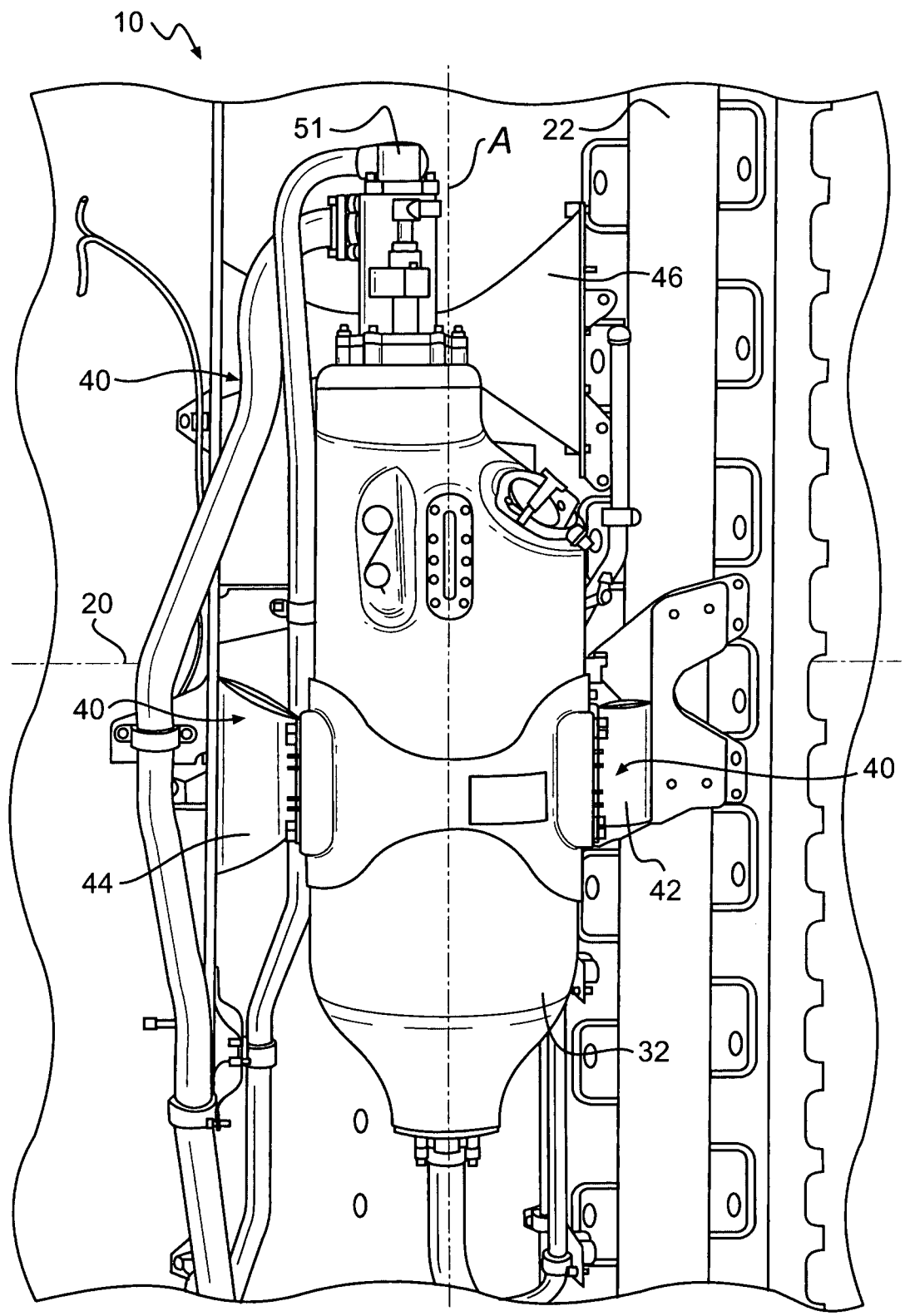
FIG. 2 is a top view of a portion of a gas turbine engine assembly having an auxiliary component mounted to the engine casing with a mount system according to the present invention.

Referring to FIG. 2, a three-point mount system 40 includes side brackets 42, 44 and a top bracket 46. It should be understood that fewer or additional brackets may be utilized to mount an auxiliary component 32 within the contemplation of this invention. One side bracket 42, 44 is positioned on each side of the auxiliary component 32, forward and aft thereof relative to the gas turbine engine longitudinal axis 20. The side brackets 42, 44 are preferably positioned on each side of the auxiliary component center of gravity. It should be understood that the position of the side brackets 42, 44 may vary depending upon the size and shape of the auxiliary component 32. Generally, the side brackets 42, 44 are positioned nearest to the average location of the weight of the auxiliary component 32 as possible without interfering with design functionality. By positioning the side brackets 42, 44 near the average location of the weight of the auxiliary component, the side brackets 42, 44 provide a rigid attachment of the auxiliary component 32 to the engine casing 22 during normal engine operation to generally reduce vibration therefrom.

Figure 3:
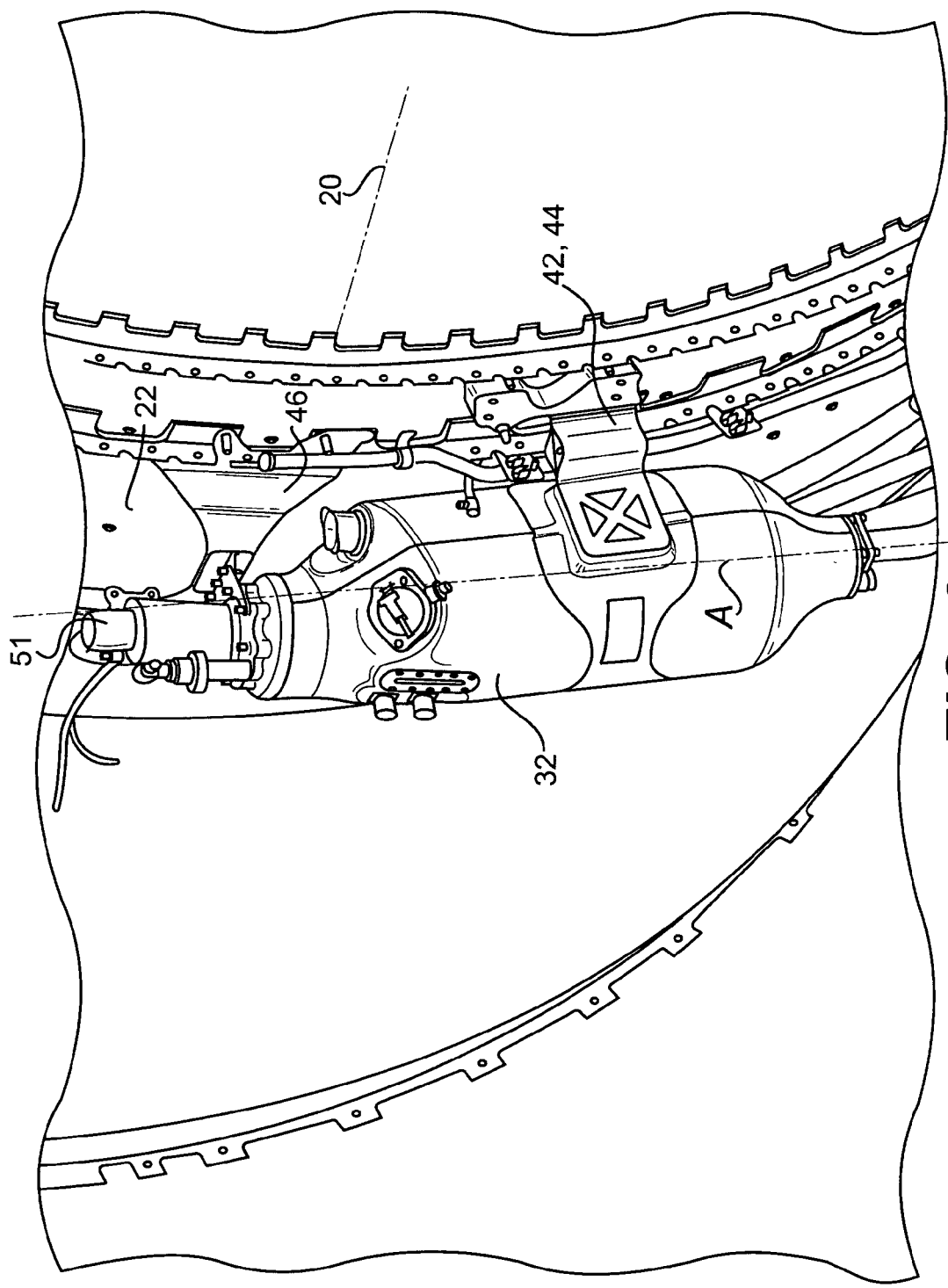
FIG. 3 is a side view of the assembly illustrated in FIG. 2.

Referring to FIG. 3, the top bracket 46 is located axially forward of the side brackets 42, 44 along the axis A of the auxiliary component 32. The top bracket 46 is positioned generally parallel relative to the engine longitudinal axis 20 of the gas turbine engine 10 near a top end segment 51 of the auxiliary component 32. It should be understood that other orientation and bracket combinations will also be usable with the present invention.

Figure 4:
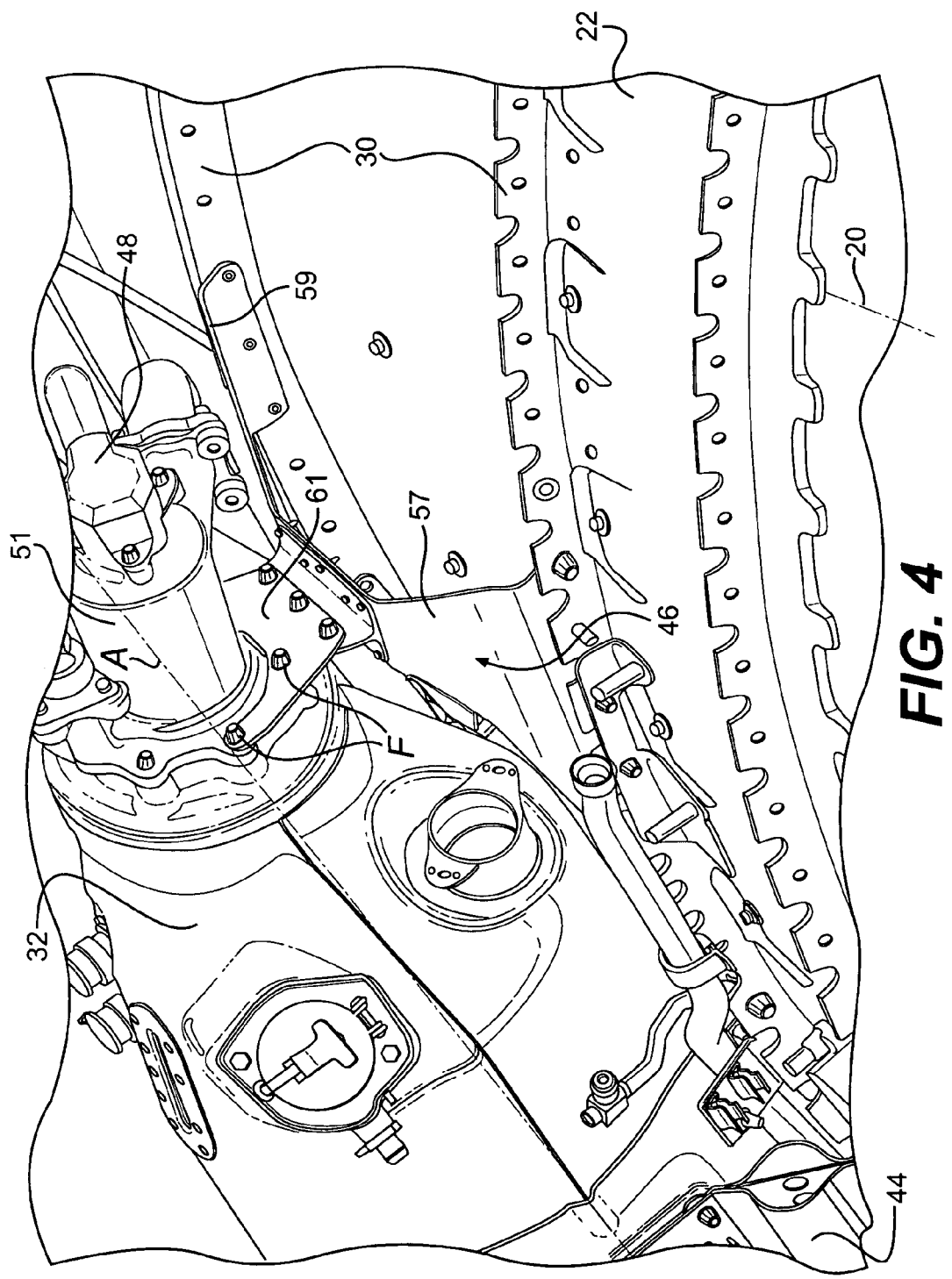
FIG. 4 is a perspective view of a top bracket position with respect to an auxiliary component and an engine casing.

Referring to FIG. 4, the top bracket 46 includes a set of arms 57, 59 and a neck portion 61. The set of arms 57, 59 are each attached to a separate engine case flange 30. The set of arms 57, 59 of the top bracket 46 engage the auxiliary component 32 through a multitude of fasteners F to provide a relatively flexible cradle between the auxiliary component 32 and the engine casing 22. That is, the side brackets 42, 44 are the primary supports for the auxiliary component 32 while the top bracket 46 generally stabilizes the auxiliary component therebetween.

The bracket components, including the side brackets 42, 44 and the top bracket 46, are preferably constructed of a sheet metal material. Preferably, the brackets are made entirely from AMS5599, Inconel 625 (nickel-alloy). This material is well suited for the present invention, because of its relative stiffness while simultaneously having a high plasticity and good fatigue properties. It should be understood that other materials and combinations thereof may be utilized to construct the brackets of the mount system of the present invention.

Figure 5:
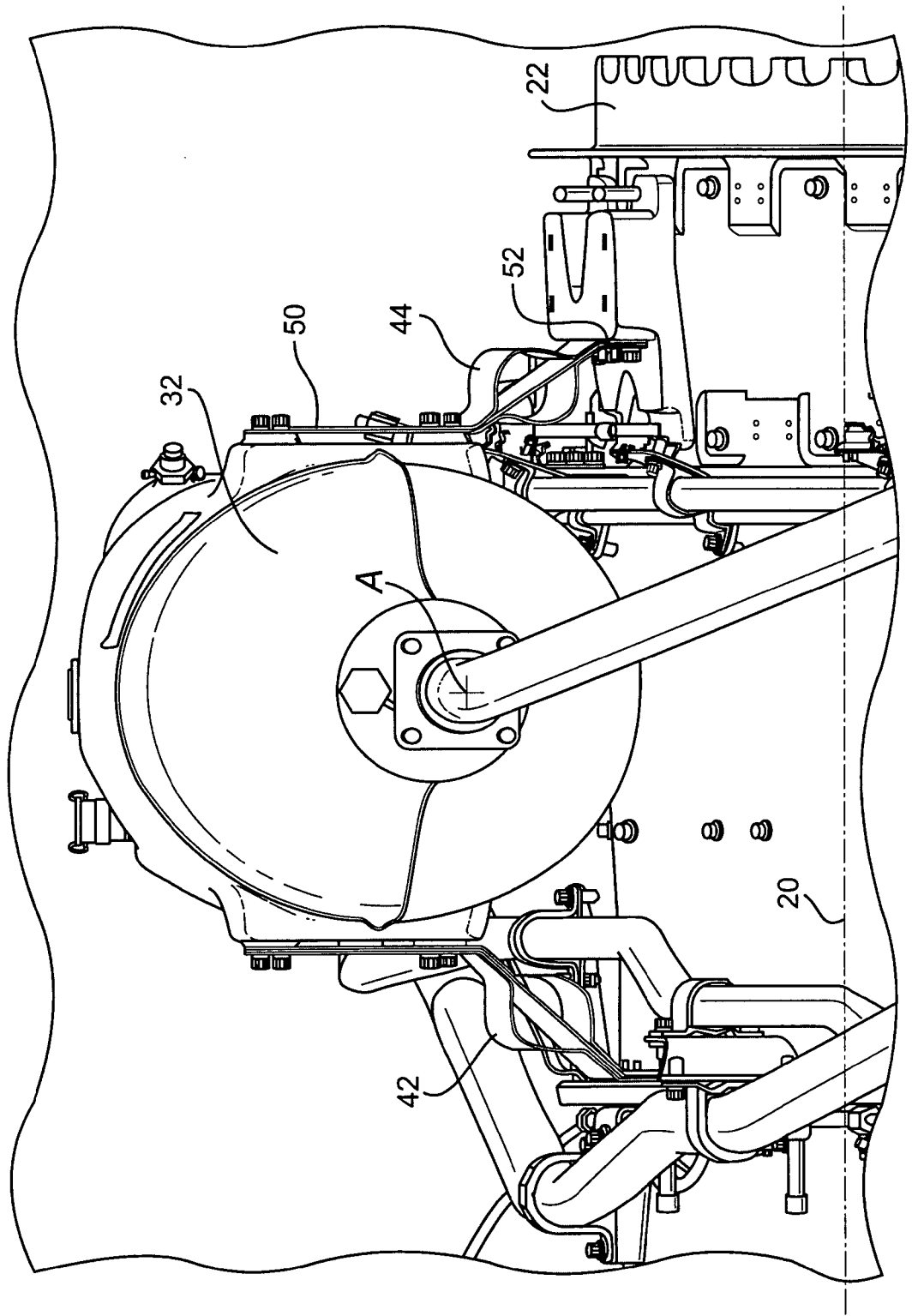
FIG. 5 is a bottom view of a portion of a gas turbine engine having an auxiliary component mounted to the engine casing with the mount system according to the present invention.

Referring to FIG. 5, the auxiliary component 32 is here mounted to the engine casing 22 such that the auxiliary component axis A (extending into the page) is transverse to the engine longitudinal axis 20 of the engine casing 22. It should be understood that various mounting arrangements are possible for the auxiliary components, and may depend on design specific parameters. The side brackets 42, 44 are aligned generally along the engine longitudinal axis 20 of the engine casing 22 and on each side of the auxiliary component axis A.

Figure 6:
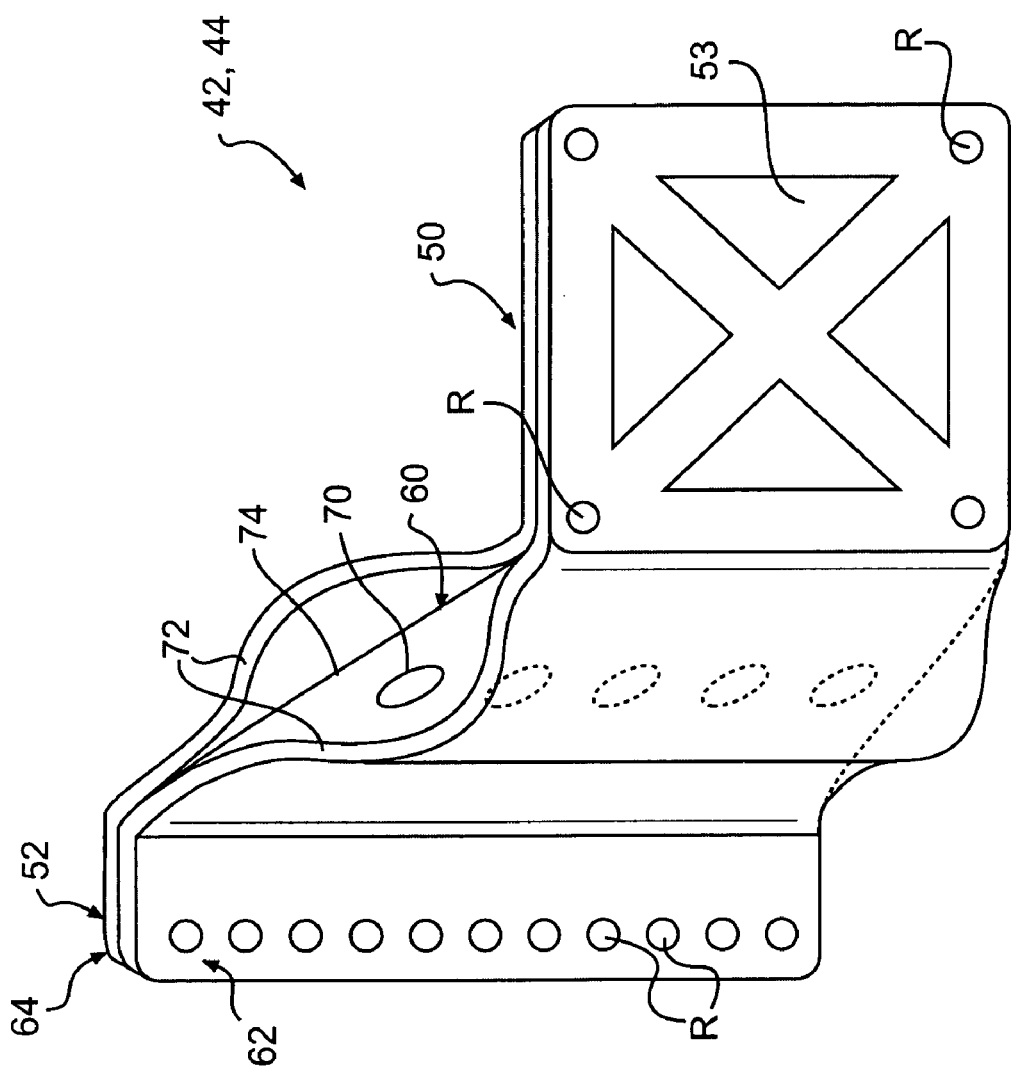
FIG. 6 is a perspective view of a side bracket according to the present invention.

Each side bracket 42, 44 defines a first mount segment 50 and a second mount segment 52. The first and second mount segments 50, 52 are planar members which are generally parallel to one another. The first mount segment 50 attaches to the auxiliary component 32 and the second mount segment 52 attaches to the engine casing 22. Preferably, the mount segments 50, 52 are fastened to the auxiliary component 32 and the engine casing 22, respectively through a plurality of apertures formed in the mount segments 50, 52 (also illustrated in FIG. 6).

The side brackets 42, 44 are manufactured of three layers, although it should be understood that any number of layers may be used to form the mount segments 50, 52. The layers are preferably riveted together at rivets R (FIG. 6) to maintain the structural integrity of the mount segments 50, 52; however, other attachments including welding may also be utilized to sandwich the layers of the brackets 42, 44. The mount segments 50, 52 may include weight reducing openings 53 to still further reduce the overall weight of the side brackets 42, 44. The construction of the side brackets 42, 44 preferably requires no welding, brazing or the like. The side brackets 42, 44 are assembled from three pieces of sheet metal. Separation of the individual segments of the side brackets 42, 44 as hereinabove described is for purposes of description only.

Each side bracket 42, 44 includes a deformable member 60 sandwiched between a first and a second retainer member 62, 64. The deformable member 60 defines a planar segment 74 which extends transversely to the mount segments 50, 52. The deformable member 60 is sandwiched between a first retainer member 62 and a second retainer member 64. The retainer members 62 and 64 include at least partially non-planar segments 72 between the mount segments 50, 52. The non-planar segments 72 flank but are separated from the planar segment 74 of the deformable member 60 between the planar mount segments 50, 52. That is, the retainer members 62, 64 sandwich the deformable member 60 therebetween to provide a laminated side bracket 42, 44 design.

The planar segment 74 of the deformable member 60 defines a series of openings 70 generally transverse to the mount segments 50, 52. The size and quantity of the openings 70 is determined by application specific parameters including the shear strength and the load strength of the material used to fabricate the deformable member 60 and the magnitude of the shock loads expected to be experienced by the deformable member 60. It should be understood that the deformable member 60 may be designed with a single opening or without any openings 70 by utilizing a more brittle material as a substitute for the nickel-alloy sheet metal material preferably used to fabricate the deformable member 60. In one example, titanium is substituted as the material for the deformable member 60. The deformable member 60 is designed to reach ultimate strain at a predetermined load that is expected to be experienced during a particular high shock load such as during a fan-blade out event.

The first retainer member 62 and the second retainer member 64 are disposed on each side of the deformable member 60 to sandwich the deformable member 60 therebetween. The retainer members 62, 64 each include the non-planar segment 72 adjacent the planar segment 74 of the deformable member 60. Preferably, the non-planar segments 72 are pre-formed sections that to include an arcuate bend.

During normal engine operation, the side brackets 42, 44 and the top bracket 46 are sufficiently stiff to rigidly support the auxiliary component 32. The retainer members 62, 64 and the deformable member 60 of the side bracket 42, 44 provide the necessary rigidity to support the auxiliary component 32 relative to the engine casing 22.

Figure 7:
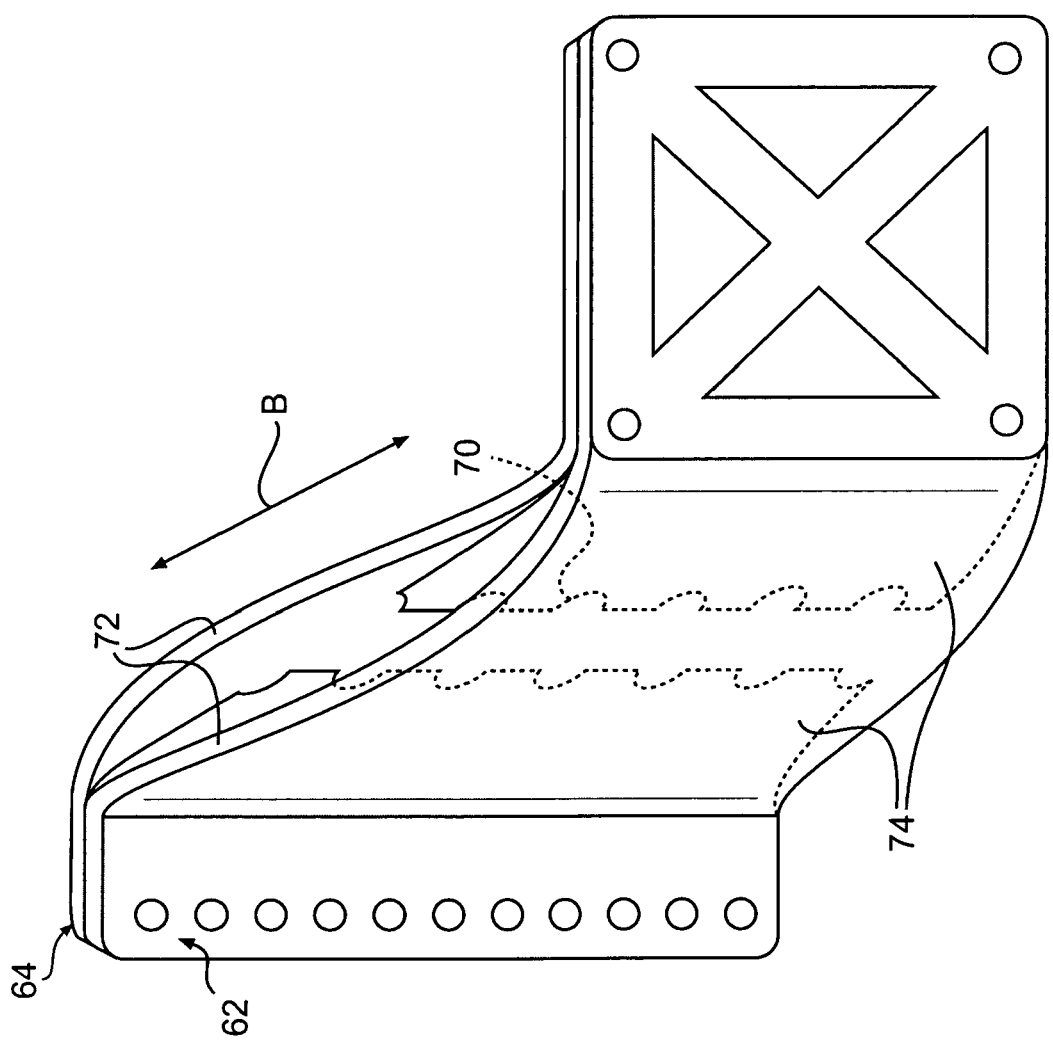
FIG. 7 is a perspective view of the side bracket of the present invention after experiencing a high shock loading event.

Referring to FIG. 7, the side bracket 42, 44 is illustrated after being subjected to a fan-blade out event. That is, the openings 70 provide a predefined failure area. Relatively severe engine rotor imbalance occurs due to the fan-blade out event such that the deformable member 60 may tear, shear, buckle, fuse or otherwise deform in tension along the openings 70. The plastic deformation of the deformable member 60 absorbs a majority of the high shock load. The balance of the shock loads are absorbed by the retainer members 62, 64 in which the non-planar segments 72 of the retainer members 62, 64 extend (illustrated schematically by arrow B) and collapse toward or bulge away from each other to provide a further load absorption path. That is, the combination of the deformable member 60 failure and extension of the non-planar segments 72 of the retainer members 62, 64 absorb the high shock load by essentially extending the time period of the high shock load event. The retainer members 62, 64 also retain the auxiliary component 32 to the engine casing 22 subsequent to the fan-blade out event such that the auxiliary component 32 does not break completely free. In this way, the mount system 40 may be sacrificed while the integrity of the auxiliary component 32 is maintained.

The foregoing shall be interpreted as illustrative and not in a limiting sense. A worker of ordinary skill in the art would recognize that certain modifications would come within the scope of this invention. For that reason, the following claims should be studied to determine the true scope and content of this invention.

What is claimed is:

1. A mounting bracket that mounts an auxiliary component to a gas turbine engine casing, comprising: a first mount segment; a second mount segment; a deformable member between said first mount segment and said second mount segment, wherein a portion of said deformable member extends transversely relative to each of said first mount segment and said second mount segment; a retainer member between said first mount segment and said second mount segment, wherein a portion of said retainer member flexes and a portion of said deformable member plastically deforms by breaking in response to a high shock load; and wherein said deformable member includes a planar segment, a first transverse segment and a second transverse segment, where said first transverse segment and said second transverse segment extend transversely from said planar segment.

2. The mounting bracket as recited in claim 1, wherein said deformable member defines an opening that extends through said deformable member.

3. The mounting bracket as recited in claim 1, wherein said deformable member defines a series of openings that extend through said deformable member, and said series of openings includes at least three openings.

4. The mounting bracket as recited in claim 1, wherein said first mount segment and said second mount segment include a segment of said deformable member laminated to a first and second segment of said retainer member.

5. The mounting bracket as recited in claim 4, comprising a second retainer member mounted between said first mount segment and said second mount segment opposite said first mount segment to sandwich said deformable member therebetween.

6. The mounting bracket as recited in claim 5, wherein said first mount segment and said second mount segment are defined by a segment of said deformable member sandwiched to a first and second segment of said second retainer member respectively.

7. The mounting bracket as recited in claim 1, wherein said retainer member defines a non-planar segment between said first and second mount segment.

8. The mounting bracket as recited in claim 7, wherein said non-planar segment is a curved segment in which an inner arc thereof that faces said deformable member.

9. The mounting bracket as recited in claim 1, wherein said deformable member includes a predefined failure area.

10. The mounting bracket as recited in claim 1, wherein said deformable member includes a material having a greater brittleness than a material of said first mount segment and said second mount segment.

11. The mounting bracket as recited in claim 1, wherein each of said first mount segment and said second mount segment includes a plurality of weight reducing openings.

12. A mounting bracket for a gas turbine engine, comprising: a first retainer member; a second retainer member; a deformable member sandwiched between said first retainer member and said second retainer member, wherein said deformable member includes a predefined failure area, wherein each of said first retainer member, said second retainer member, and said deformable member plastically deform by breaking in response to a high shock load; and wherein said deformable member includes a planar segment, a first transverse segment and a second transverse segment, where said first transverse segment and said second transverse segment extend transversely from said planar segment.

13. A mounting bracket for a gas turbine engine, comprising: a first retainer member including a first curved segment; a second retainer member including a second curved segment; a deformable member sandwiched between said first retainer member and said second retainer member, wherein said deformable member defines a series of openings, and wherein said first curved segment and said second curved segment collapse relative to said deformable member and said deformable member plastically deforms by breaking along said series of openings in response to a high shock load: and wherein said deformable member includes a planar segment, a first transverse segment and a second transverse segment, wherein said first transverse segment and said second transverse segment extend transversely from said planar segment.

14. The mounting bracket as recited in claim 13, wherein said series of openings includes at least three openings that define a predefined failure area through said deformable member.

* * * * *